Sept. 14, 1954  I. MINK  2,688,750
BIB CONSTRUCTION
Filed May 31, 1952
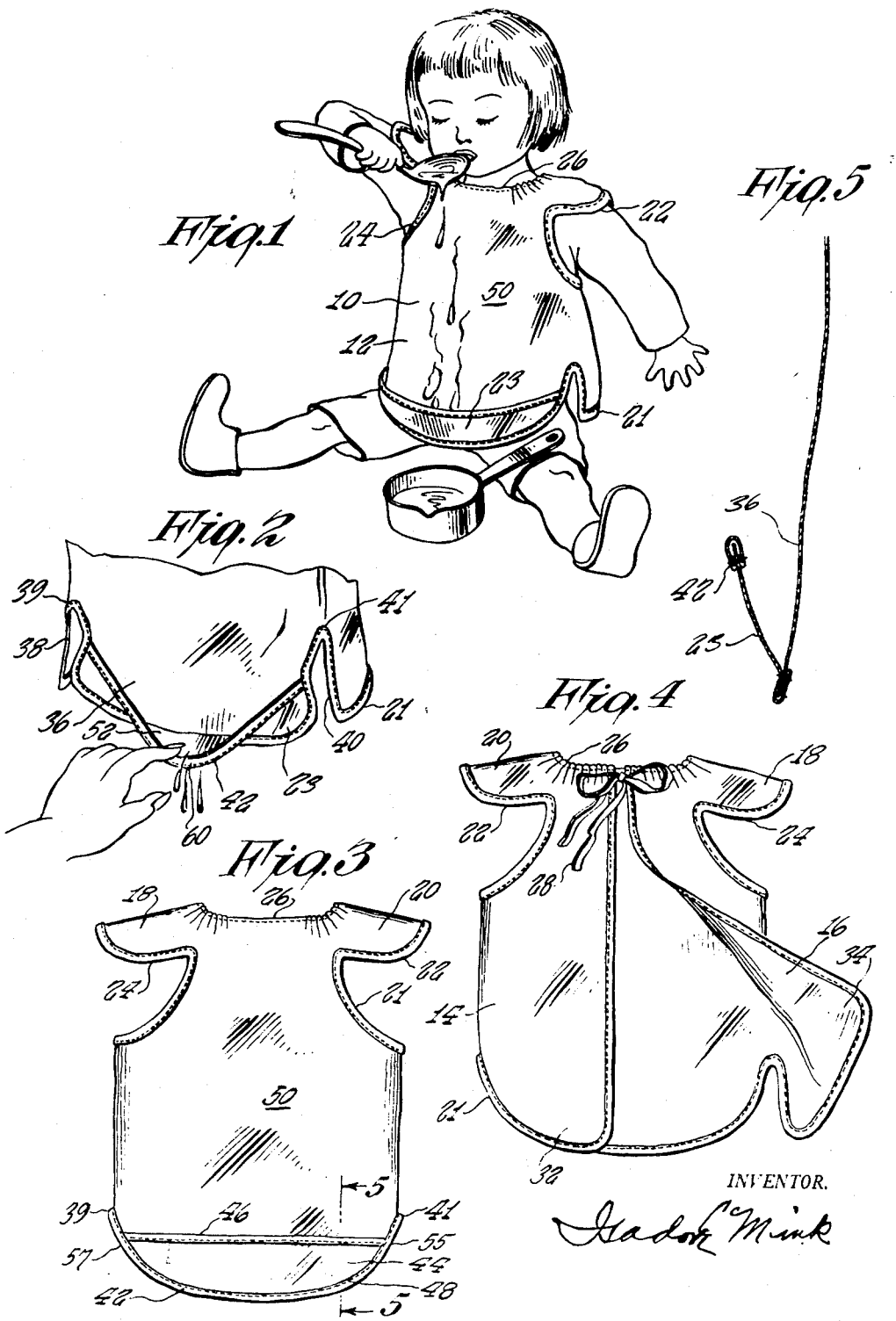
INVENTOR.
Isadore Mink Patented Sept. 14, 1954

2,688,750

UNITED STATES PATENT OFFICE 2,688,750

BIB CONSTRUCTION

Isadore Mink, Brooklyn, N. Y., assignor to Minkplastic Corporation, a corporation of New York Application May 31, 1952, Serial No. 290,958

1 Claim. (Cl. 2—49)

This invention relates generally to bibs and bib construction for use by infants of very young ages, and more particularly to an improved bib construction having means for preventing not only the soiling of the infant's clothes during eating, but of saving a large quantity of food which is normally spilled by the infant during the course of eating.

As is well known, infants when learning to feed themselves, owing to their lack of skill in handling eating implements, usually spill a large amount of food when inserting the implement into the mouth. This food runs down the front outer surface of the bib, and where large quantities of food are so spilled, incomplete protection is afforded by the bib in that the spilled food runs past the bib to soil the infant's clothes thereunder, the floor, or furniture upon which the child is seated. Additionally the food itself is made unsanitary, so that it cannot be reclaimed for subsequent feeding.

It is therefore among the principal objects of the present invention to provide an improved form of bib construction, in which the above mentioned disadvantageous results have been substantially eliminated.

Another object of the invention herein lies in the provision of improved bib construction in which means in the form of a curved pocket has been incorporated into the forward portion of the same, which structure is adapted to catch and retain food spilled by the infant, the same being capable of being reclaimed in an edible condition.

A further object of the invention herein lies in the provision of bib structure possessing the above mentioned advantages, in which the cost of manufacture may be of a relatively low order, with consequent wide sale, distribution and use.

Another object of the invention herein lies in the provision of bib construction of the class described in which the above mentioned means may be so shaped and disposed as to enable it to catch drippings accumulating over a relatively wide area on the forward surface of the bib.

A feature of the invention lies in the fact that the novel pocket structure is so situated as to fall under the action of gravity to an opened position, when the device is donned by the wearer, it being unnecessary to adjust the structure, except when emptying the same.

Another feature of the device lies in the fact that the structure may be adapted for use with a wide variety of bib designs, so that the finished device may not only be useful, but attractive in appearance as well.

Still another feature of the invention lies in the fact that the device may be constructed using materials and methods already known in the art to which the invention pertains.

On the drawing, to which reference will be made in the specification, similar reference characters have been employed to designate corresponding parts throughout the several views.

Figure 1 is a view in perspective showing an embodiment of the device positioned upon a user.

Figure 2 is an enlarged fragmentary view in perspective showing the manual opening of the food catching and retaining structure, as when emptying the same.

Figure 3 is a front elevational view of the device.

Figure 4 is a rear elevational view of the device.

Figure 5 is a fragmentary enlarged vertical sectional view as seen from the plane 5—5 on Figure 3.

In accordance with the invention, the device, generally indicated by reference character 10, comprises broadly: a front panel element 12, a left rear panel element 14, a right rear panel element 16, shoulder panels 18 and 20, and food-retaining means 23. The device 10 is preferably formed from a durable, moisture-proof, washable material, such as a suitable synthetic resin in planar form. The free edges of the device are preferably covered with an edge binding 21 which may be either stitched into position, or integrated by heat-sealing means.

The upper portion of the device is provided with a pair of arm openings 22 and 24, as well as a neck opening 26, the size of which is adjustable by means of a drawstring 28. The rear tail portions 32 and 34 are preferably of generally arcuate shape to correspond to the front tail portion 36, the same forming a pair of indented side portions 38 and 40 and disposed substantially beneath the arm openings 22 and 24. The side portions 38 and 40 are of substantially inverted V-shape, terminating in upper apices 38 and 41, disposed a substantial distance above the lowermost portion of the device. As may be seen on Figures 1, 2 and 3, the points 39 and 41 are also disposed a substantial distance above the food-saving means 23.

The means 23 comprises a food-retaining panel 44, preferably formed from the same material as the remaining portions of the garment, which has a pocket-shaped configuration including a substantially rectilinear top edge 46 and a curved lower edge 44 coextensive with the edge 42 which bounds the lower part of the front tail portion 36, As may be seen on Figure 3, the panel 44 extends substantially the full width of the front tail portion 36, and it has been found that a height of approximately two inches is satisfactory, although greater or lesser heights may be employed to conform to the size of the particular device. Although, as may be seen on Figure 3, the length of the rectilinear edge 46 is substantially the same as the straight line distance between the points 55 and 57 on the edge 42, where desired the length of the edge 46 may be slightly greater, for the purpose of obtaining a particularly wide opening when the device is in use.

The device 10 is donned in a normal manner, the arms of the infant being threaded through the openings 22 and 24, after which the drawstring 28 is tied behind the neck. The means 23 will normally fall to an opened position as shown on Figure 1, owing to the tendency of the material forming the edge 46 to sag under the action of gravity. Since the indented portions 35 and 40 extend upwardly of the points 55 and 57, practically no tension in a horizontal plane is exerted along this edge, to interfere with the normal opening action obtained. Rather, tension exerted with the edge 42 is transmitted along the same, reaction with the principal portions of the garment being obtained at the points 39 and 41. Thus, as the infant spills food while attempting to insert the same into its mouth, the same will strike the outer surface 50 of the front panel element 12 to fall under the action of gravity to the pocket-like recess 52 formed between the panel 44 and the panel 12. The food may be allowed to accumulate during all or a part of the time the infant is feeding itself, and during the feeding or upon completion of the feeding the recess 52 may be emptied as shown on Figure 2, when the edge 46 is stretched to form a pouring lip 60, as that the collected food may be drained into a suitable vessel. Where the food is of more or less solid consistency, a spoon may be inserted into the recess 52 to urge the same toward the lip 60, as required.

After the recess 52 has been emptied, the device 10 may be removed from the infant and washed in a well known manner, care being taken to assure that the recess 52 is thoroughly cleaned. An important feature of the invention is that even when the food retaining means is full, outward pressure upon the edge 46 is transmitted as tension to the points 39 and 41, preventing inversion of the food pocket and accidental tilting and spilling.

It may thus be seen that I have provided novel and highly useful improvements in bib construction, in which there is provided an efficient means for preventing the loss of food spilled by an infant during the process of feeding itself. Not only is the food prevented from contaminating surrounding objects, but the same is preserved in a sanitary state for subsequent use where desired. The device is simple in construction and operation, and possesses sufficient durability to assure a relatively long useful life.

I wish it to be understood that I do not consider the invention limited to the exact details of structure shown and set forth in this specification, for obvious modifications will occur to those skilled in the art to which the present invention pertains.

I claim:

Bib construction comprising: a front panel element and left and right rear panel elements forming at the lower portions thereof a front tail portion and left and right rear tail portions; a reinforced edge member extending continuously from one of said rear tail portions to said front tail portion and said other tail portion, said reinforced edge having a substantially inverted V-shape at the juncture of said front tail portion with said rear tail portions, the apices of which are disposed a substantial distance above the lowermost part of said tail portions; a food retaining panel extending across said front tail portion and secured at the side and lower edges thereof to said reinforced edge, said food retaining panel having an upper edge which is disposed substantially below said apices.

References Cited in the file of this patent

UNITED STATES PATENTS

| Number | Name | Date |
|---|---|---|
| 2,135,286 | Helmuth | Nov. 1, 1938 |
| 2,442,293 | Hudson | May 25, 1948 |
| 2,446,689 | Brose et al. | Aug. 10, 1948 |
| 2,451,038 | Mink | Oct. 12, 1948 |